United States Patent Office 2,881,694
Patented Apr. 14, 1959

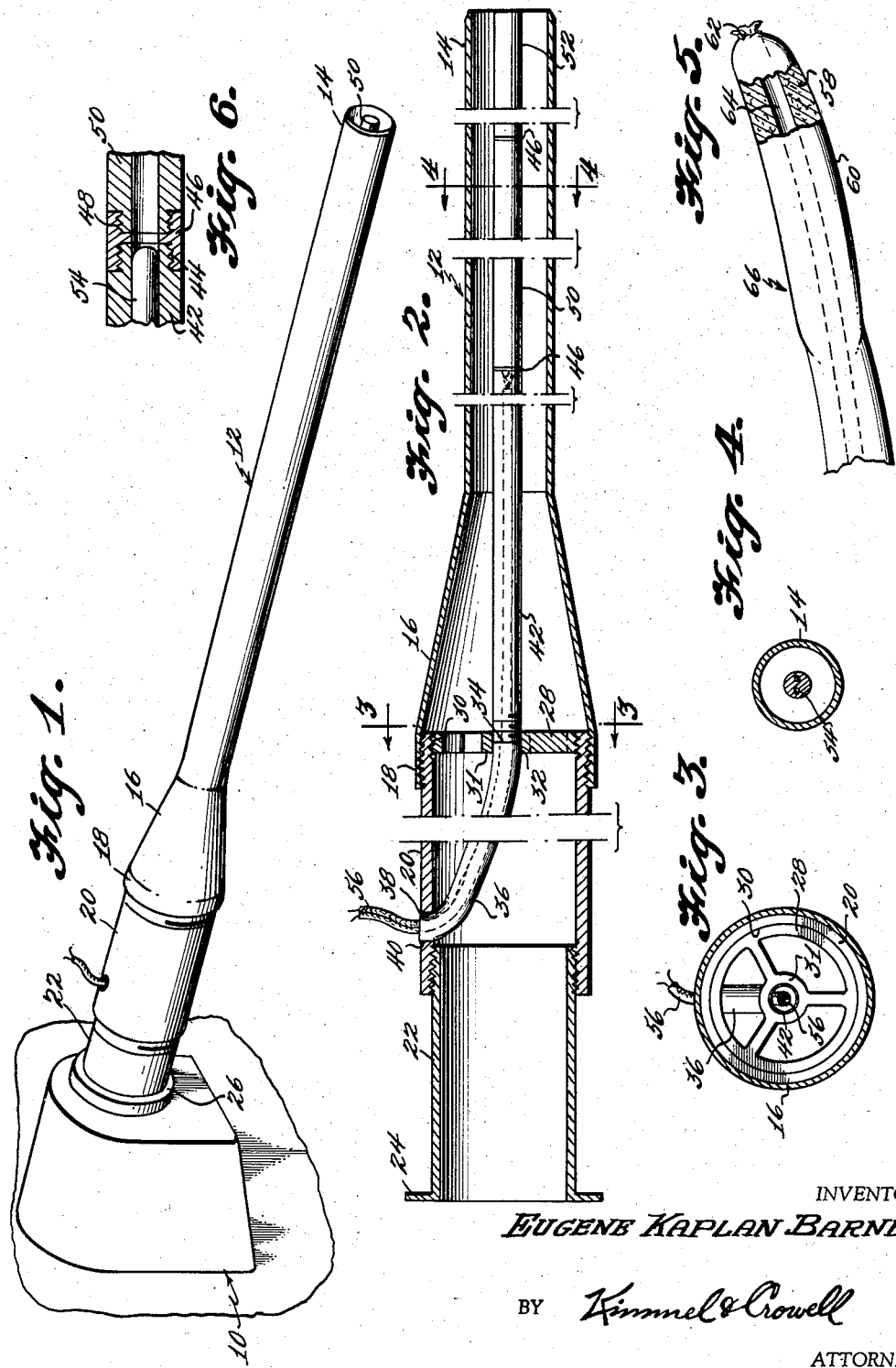

2,881,694

SAUSAGE STUFFING HORN

Eugene Kaplan Barnes, Allston, Mass.

Application January 5, 1956, Serial No. 557,502

1 Claim. (Cl. 99—354)

This invention relates to a food stuffing machine and its product, and more specifically, the invention pertains to a device for stuffing sausages, frankfurters, and other related foods, and is a continuation-in-part of my copending application filed February 7, 1955, Serial No. 486,573, and entitled Sausage Stuffing Horn and Product, now abandoned.

One of the primary objects of this invention is to provide a meat product of the type described above which will decrease, to substantially one-half, the amount of time normally required to steam, boil, or grill the conventional product to render it suitable for human consumption.

Another object of the invention is to provide a meat product of the type described, such as a frankfurter or sausage, wherein the diameter of the product can be increased or decreased commensurately with the size of such product desired to be manufactured or produced and wherein by weight, the product will be the same as a conventional product but in diameter may be approximately a third to a half greater than the conventional product.

A further object of this invention is to provide a meat product of the type to which reference has been made which is provided with a centrally positioned longitudinally extending substantially hollow cylindrical passage.

As a further object of this invention it is proposed to provide in a device of the type described with means for sealing the cylindrical passage.

Still another object of this invention is to provide a frankfurter, for example, which will pack from seven to ten to the pound as compared with the present day packaging of five to the pound.

This invention also contemplates the provision of a food product as described above which has a substantially hollow core extending longitudinally thereof, the frankfurter upon being sliced longitudinally dividing into a pair of halves each having a semicircular longitudinally extending recess formed therein which may be packed with condiments or other suitable edible substances according to taste.

As yet another object of this invention it is proposed to provide means in a sausage, frankfurter, or other similar food products for retaining and conserving the juices of the product during the heat treatment thereof.

The provision of an attachment for conventional meat stuffing machine for making a food product of the type described is a further object of the present invention.

This invention also has as a further object the provision of an attachment for a conventional meat stuffing machine, the attachment being inexpensive to manufacture, non-complex to connect with the machine, positive in operation, and durable in use.

Another important object of this invention is to provide a method of making sausages, frankfurters or like ground meat products which consists in having a heating member extending lengthwise centrally into a casing, packing uncooked ground meat into the casing around said heating member to sear or partly cook the meat and form a lengthwise hollow passage through the product.

Other and further objects and advantages of the instant invention will become more evident from a consideration of the following specification when read in conjunction with the annexed drawing, in which:

Figure 1 is a partial illustration of a food stuffing machine to which has been attached a device for producing the food product illustrated in Figure 5;

Figure 2 is a medial longitudinal cross-sectional view of the device shown in Figure 1;

Figure 3 is a cross-sectional view taken on the line 3—3 of Figure 2, looking in the direction of the arrows;

Figure 4 is a cross-sectional view taken on the vertical plane of line 4—4 of Figure 2, looking in the direction of the arrows;

Figure 5 is a perspective view of a food product formed in accordance with the present invention, and Figure 6 is a detail, fragmentary cross-sectional view illustrating the connection between the several conduits.

Referring now more specifically to the drawing, reference numeral 10 designates, in general, a conventional sausage, frankfurter, or ground meat stuffing machine to which an attachment 12, constructed in accordance with the teachings of this invention, has been secured. The attachment is comprised of a conventional meat stuffing horn 14 having an elongated substantially hollow cylindrical body portion which is integrally connected to the narrow end of an outwardly flared frusto-conical neck portion 16. The larger end of the neck portion 16 terminates in an integrally formed internally threaded cylindrical collar 18 which is threadedly mounted on one end of an extension sleeve 20 which is internally threaded at its other end. The other end of the sleeve 20 is threaded over one end of conduit 22 which terminates at its other end in a radial flange 24. The flange 24 is connected by a conventional lock ring 26 to the discharge port (not shown) of the machine 10.

An externally threaded spider 28 is threadedly connected at 30 to the outer end of the sleeve 20 and the spider 28 is provided with a centrally positioned hub 31 having an aperture 32 internally threaded at 34 over a portion of its length.

An elongated hollow conduit 36 is disposed within the sleeve 20 and has a laterally bent end portion 38 which is frictionally wedged in an opening 40 formed in the sleeve 20. The other end of the conduit 36 projects forwardly and is frictionally wedged in the smooth bore of the aperture 32.

The threaded portion 34 of the aperture 32 threadedly receives one end of an elongated conduit 42. The other end of the conduit 42 is reduced and threaded at 44 to receive one end of a heat insulating connector 46 formed of conventional material. The other end of the connector 46 threadedly receives the reduced end 48 of another conduit 50. One end of still another conduit 52 is connected by a second connector 46 to the other end of the conduit 50.

A conventional electrical resistance heating unit 54 is disposed in the conduit 50 and is connected through cable 56 with a suitable source of current. The unit 54 must be capable of heating at varying degrees up to 600° F. and thereafter to any degree of heat necessary to achieve the meat searing purposes hereinafter mentioned.

With the attachement 12 fixedly secured to the discharge port of the ground meat stuffing machine 10 and a casing (not shown) mounted on the horn 14, operation of the machine 10 will cause the meat 58 to discharge through the conduit 22, the sleeve 20, the neck 16, and pass into the horn 14 where it compacts around the conduits 42, 50 and 52. As the compacted meat 58 passes the discharge end of the horn 14 the meat enters the casing 60 and as it fills the latter the casing 60 is drawn from the horn 14. The filled casing is then tied off, as indicated at 62, at longitudinally spaced intervals in the conventional manner to form a continuous chain of connected links 44 having a longitudinal passage 64. As the meat passes the conduit 50 the wall of the passage 64 is seared to prevent the meat juices and particles of the meat from entering the passage.

The compacted meat 58 now expands within the casing 60 and assumes a diameter which is from one-third to one-half, or more greater than the diameter of a conventional sausage or frankfurter.

One of the resulting links 66 is illustrated in Figure 5. As illustrated therein, the links is seen to have a longitudinally extending cylindrical centrally positioned hollow passage 64 which, when the link is divided longitudinally, provides a semicircular recess in each section thereof.

The recess may receive various condiments and stuffing ingredients, and also serves as a receptacle for juices which may be exuded from the meat.

The increased size of the links in its diameter makes possible the packaging of from seven to ten to the pound instead of the conventional five to the pound when packaging the conventional product.

From the foregoing description it is now evident that, without iteration, the new food product attains all of the other objects of this invention hereinbefore stated at considerable length.

It will be seen that an objective of this invention is to form a passage through the frankfurter, sausage, or like finished food product. The uncooked meat with which the sausage is stuffed is relatively fluid. When the stuffed casing is formed, in links or singly as the case may be, the product is then partially cooked or smoked and the meat becomes firm. In my invention, I provide a partial cooking or sufficient heat through the product to cause the meat to set firmly around a heating element to thereby form a passage through the product when it is removed from the heating element. When the sausage with this passage through it is formed, the over-all diameter of the sausage can be made greater with only the same amount of meat as a smaller fully packed sausage and thus give the illusion of a larger sausage. The sausages are always sold by weight so the public still gets the same value, except that it gets more units to the pound. Furthermore, when this new sausage is cooked, the passage preserves the juices and the sausage has a greater diametrical swell.

While as shown herein the heating element is an electrical device, it could be electronic or otherwise heated.

Having described and illustrated one embodiment of this invention in detail, it is to be understood that the same is offered merely by way of example, and that the invention is to be limited only by the scope of the appended claim.

What is claimed is:

A meat stuffing device comprising a cylindrical conduit, a radial flange integrally secured to one end of said conduit for connection with the discharge side of a meat stuffing machine, said conduit being externally threaded at the end thereof opposite said flange, a cylindrical sleeve having one of its ends internally threaded and detachably connected with the threaded end of said conduit, said sleeve having the other end thereof internally and externally threaded, an externally threaded annular spider detachably secured to the internal threads of said sleeve, an elongated cylindrical horn having a diameter substantially less than the diameter of said sleeve, an intergral frusto-conical neck extending axially from one end of said horn with the smaller diameter end thereof connected to said horn, an internally threaded cylindrical collar integrally connected to the larger diameter end of said neck and extending axially thereof, said sleeve having an aperture formed therein, said spider having a central apertured hub, a tube having one of its ends fixedly secured in the apertured hub of said spider and the opposite end secured in the aperture in said sleeve, a plurality of tubes arranged in end-to-end relation with their respective adjacent ends detachably secured together, said last named tubes being disposed centrally with said horn and said neck and having a free end of one of said tubes releasably secured in said apertured hub, and an electrical heating unit disposed within one of said last named tubes with the leads thereof extending through said tube disposed within said sleeve, whereby meat extruded from said device will have a central aperture formed therein with the meat surrounding the aperture seared by said heating unit to maintain the aperture in said meat.

References Cited in the file of this patent

UNITED STATES PATENTS

| | | | |
|---|---|---|---|
| 1,107,184 | Priban | Aug. 11, | 1914 |
| 1,881,171 | Cooley | Oct. 4, | 1932 |
| 1,909,593 | Parsons | May 16, | 1933 |
| 2,125,589 | Shuman | Aug. 2, | 1938 |
| 2,174,319 | Gastrow | Sept. 26, | 1939 |
| 2,186,435 | Serr | Jan. 9, | 1940 |
| 2,203,620 | Smith | June 4, | 1940 |
| 2,240,522 | Serr | May 6, | 1941 |
| 2,386,775 | Balzarini | Oct. 16, | 1945 |
| 2,568,491 | Edwards | Sept. 18, | 1951 |